(No Model.)
B. H. KEMBLE.
AXLE LUBRICATOR.
No. 453,838. Patented June 9, 1891.
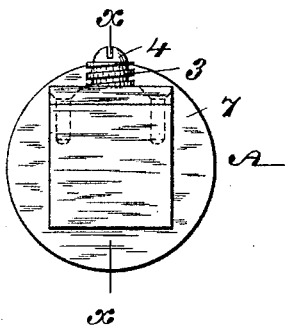
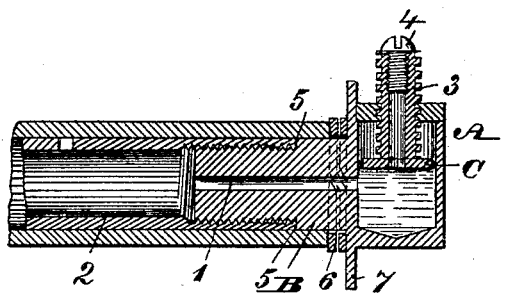
Witnesses
Theo. Rollé.
A. P. Jennings.
Inventor
Bushrod H. Kemble
By his Attorneys
Wiedersheim & Kintner

UNITED STATES PATENT OFFICE.

BUSHROD H. KEMBLE, OF CAMDEN, NEW JERSEY.

AXLE-LUBRICATOR.

SPECIFICATION forming part of Letters Patent No. 453,838, dated June 9, 1891.

Application filed October 12, 1888. Renewed January 17, 1891. Serial No. 378,115. (No model.)

*To all whom it may concern:*

Be it known that I, BUSHROD H. KEMBLE, a citizen of the United States, formerly residing in the city and county of Philadelphia, State of Pennsylvania, now of the city and county of Camden, State of New Jersey, have invented a new and useful Improvement in Axle-Lubricators, which improvement is fully set forth in the following specification and accompanying drawings.

My invention consists of a lubricator attachable to an axle, which is provided with means for supplying oil or lubricant to the axle under pressure.

It also consists of the novel construction of the parts of the lubricator, as will be hereinafter fully set forth.

Figure 1 represents a front view of a lubricator embodying my invention. Fig. 2 represents a central longitudinal section thereof on line *x x*, Fig. 1.

Similar letters and numerals of reference indicate corresponding parts in the two figures.

Referring to the drawings, A represents a lubricator box, cup, or reservoir, from one side of which projects a tubular neck B, the bore 1 thereof being in communication with the interior of said cup. The exterior of the neck is screw-threaded for engagement with the screw-threads on the interior of a hollow journal or axle 2, whereby the lubricator may be firmly connected with said journal or axle. Within the cup is a piston or follower C, to which is connected a tubular stem 3, the exterior whereof is screw-threaded and engages with the threaded wall of an opening in the top plate of the cup, it being seen that said stem projects above said plate, whereby it is readily accessible for purposes of raising and lowering said piston. Fitted within the stem at the top thereof is a screw 4, which acts as a plug or cap for closing the bore of the stem, it being evident that when the screw is removed the cup may be readily filled with oil or lubricant.

It will be seen that the oil or lubricant readily enters the bore of the neck B, and it flows into the journal or axle, from whence it is distributed in the box through an opening in the journal or axle. As the oil continues to be expended the stem 3 is rotated, so as to lower the follower and thus subject the oil to continued pressure, causing its reliable entrance into the bore of the neck. When the level of the oil is below said bore, the piston being further lowered, will force the oil upwardly through the space around the periphery of the follower, so that it is caused to reach the bore of the neck. The neck has a shoulder 5, which abuts against the end of the journal or axle, making a tight joint thereat, and a split washer 6 is interposed between the end of the box and a flange 7 on the inner side of the cup, closing the joint between said parts, preventing leakage of oil from the journal or axle, it also being seen that the lubricator as such constitutes a nut for holding the box, and consequently the wheel, on the journal or axle.

Having thus described my invention, what I claim as new, and desire to secure by Letters Patent, is—

1. An axle-lubricator having a cup, a follower within the same, and a tubular stem connected with said follower communicating with the cup, substantially as described.

2. An axle-lubricator having a cup or reservoir, a follower within said cup, a tubular stem attached to said follower, and a closing plug or cap fitted to said stem, the cup having an outlet leading to the axle or journal, substantially as described.

3. An axle-lubricator having a cup with tubular neck, an axle in which said neck is inserted and which is provided with an opening in its periphery, and a follower in said cup adapted to exert pressure upon the contents thereof, said parts being combined substantially as described.

4. An axle-lubricator having a cup with tubular neck, the latter having a peripheral shoulder thereon, an axle in which said neck is inserted and against the end of which said shoulder abuts, and a box in which said axle and shouldered portion of neck closely fit, said parts being combined substantially as and for the purpose set forth.

B. H. KEMBLE.

Witnesses:
JOHN A. WIEDERSHEIM,
A. P. JENNINGS.